United States Patent
Dræge

(10) Patent No.: US 11,269,104 B2
(45) Date of Patent: Mar. 8, 2022

(54) FLUID SUBSTITUTION

(71) Applicant: EQUINOR ENERGY AS, Stavanger (NO)

(72) Inventor: Anders Dræge, Florvåg (NO)

(73) Assignee: EQUINOR ENERGY AS, Stavanger (NO)

(*) Notice: Subject to any disclaimer, the term of this patent is extended or adjusted under 35 U.S.C. 154(b) by 201 days.

(21) Appl. No.: 16/611,286

(22) PCT Filed: May 11, 2018

(86) PCT No.: PCT/NO2018/050123
§ 371 (c)(1),
(2) Date: Nov. 6, 2019

(87) PCT Pub. No.: WO2018/208172
PCT Pub. Date: Nov. 15, 2018

(65) Prior Publication Data
US 2020/0166667 A1    May 28, 2020

(30) Foreign Application Priority Data
May 11, 2017 (GB) ........................... 1707560

(51) Int. Cl.
*G01V 1/50* (2006.01)

(52) U.S. Cl.
CPC ........ *G01V 1/50* (2013.01); *G01V 2210/6161* (2013.01); *G01V 2210/6169* (2013.01);
(Continued)

(58) Field of Classification Search
CPC ............. G01V 1/50; G01V 2210/6161; G01V 2210/6169; G01V 2210/6222; G01V 2210/6244
See application file for complete search history.

(56) References Cited

U.S. PATENT DOCUMENTS

2010/0312534 A1* 12/2010 Xu ........................... G01V 1/50
                                                                  703/2
2017/0212275 A1*  7/2017 Skelt .................... G01V 99/005
2018/0128929 A1   5/2018 Roy et al.

FOREIGN PATENT DOCUMENTS

CN    102096107 A    6/2011
CN    104714249 A    6/2015
(Continued)

OTHER PUBLICATIONS

Smith et al., "Gassmann fluid substitutions: A tutorial", Geophysics, vol. 68, No. 2 (Mar.-Apr. 2003); p. 430-440 (Year: 2003).*
(Continued)

*Primary Examiner* — Regis J Betsch
(74) *Attorney, Agent, or Firm* — Eversheds Sutherland (US) LLP

(57) ABSTRACT

A method of fluid substitution, wherein an initial data set is provided, wherein a substituted data set is provided, wherein a rock physics model is provided, wherein the initial data set includes initial data of a geophysical parameter and initial fluid data, and wherein the substituted data set includes substituted fluid data. The method includes using the model and the initial data set to calculate first calculated data of the geophysical parameter, using the model and the substituted data set to calculate second calculated data of the geophysical parameter, calculating the difference between the first calculated data of the geophysical parameter and the second calculated data of the geophysical parameter, and applying the difference to the initial data of the geophysical parameter to produce substituted data of the geophysical parameter.

20 Claims, 2 Drawing Sheets

(52) U.S. Cl.
CPC ............... *G01V 2210/6222* (2013.01); *G01V 2210/6244* (2013.01)

(56) References Cited

FOREIGN PATENT DOCUMENTS

| | | |
|---|---|---|
| CN | 106443780 A | 2/2017 |
| WO | 2006062612 A2 | 6/2006 |

OTHER PUBLICATIONS

Vera et al., "Fluid substitution and seismic modelling in a sandstone aquifer", CREWES Research Report—vol. 22 (2010) (Year: 2010).*

International Search Report and Written Opinion, PCT/NO2018/050123, dated Jul. 9, 2018 (6 pp.).

Search Report for GB1707560.7, dated Sep. 7, 2017 (3 pp.).

Smith, Tad M., et al., Tutorial—Gassmann flluid substitutions: A tutorial, Geophysics, vol. 68, No. 2, Mar.-Apr. 2003, p. 430-440 (11 pp.).

Saxena, Nishank, et al., Rock physics model for seismic velocity & fluid substitution in sub-resolution interbedded sand-shale sequences, Geophysical Prospecting, Feb. 20, 2018, Doi: 10.1111/1365-2478.12628, pp. 843-871 (29 pp.).

Russian Search Report, RU 2019139035/28(076763), dated Jul. 15, 2021 (4 pp.) (with English translation).

First Office Action, CN 201880045789.9, dated Mar. 30, 2021 (with English translation) (20 pp.).

Yuanjun, W., et al., Oil Geophysical Prospecting (10 pp.).

\* cited by examiner

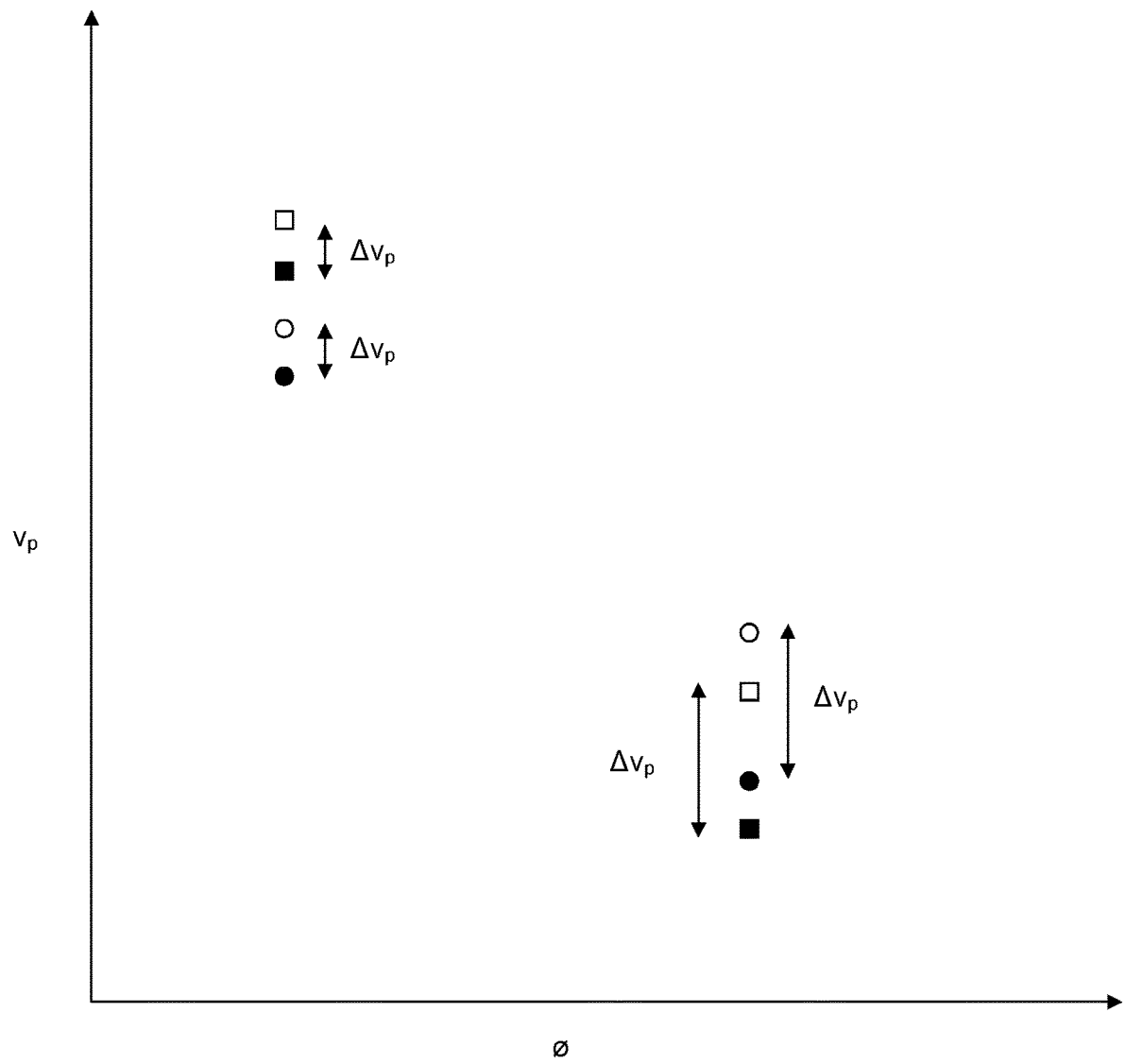

FLUID SUBSTITUTION

TECHNICAL FIELD

The present invention relates to a method of fluid substitution, a method of prospecting for hydrocarbons and a method of producing hydrocarbons.

BACKGROUND OF THE INVENTION

Fluid substitution is a technique used to predict properties of a geological structure, such as a sub-surface reservoir, if the fluid within the geological structure were to be different to the original fluid.

For instance, a reservoir may comprise rock and an original fluid. The original fluid is held within the pores of the rock.

When prospecting for hydrocarbons, geophysical surveys (such as seismic surveys) may be taken over and throughout the reservoir. Further, during exploration of the reservoir, one or more exploration wells may be drilled. However, due to obvious practical limitations, exploration wells can only be taken for a limited number of locations.

Since well logs can be taken from the exploration well (the well logs containing data relating to geophysical parameters and the original fluid present in the well), it is possible to predict geophysical data (e.g. seismic data) that would result if a different fluid were present in the geological structure instead of the original fluid. The different fluid may be a fluid with a different hydrocarbon content compared to the original fluid.

This can be of use because, as mentioned above, there may be geophysical data (e.g. seismic data) available for other locations throughout the geological structure. Using fluid substitution, it is possible to try to match the acquired geophysical data at other locations in the geological structure with different fluid types present at said other locations. Hence, it is possible to predict where in the geological structure there may be more desirable fluids for production (such as fluids with higher hydrocarbon content), or simply to understand the fluid properties throughout the reservoir.

The present standard for performing fluid substitution is Gassmann fluid substitution.

In this method, the shear and bulk modulus of the rock with the initial fluid is found using p-wave seismic data (from a well log), s-wave seismic data (from a well log) and density (from a well log).

The bulk modulus, the shear modulus and density of the solid rock material may then be estimated (e.g. the material/minerals that actually form the rock).

The bulk and shear modulus of the dry rock (e.g. the rock without any fluid present) is calculated. The bulk and shear modulus of the dry rock is different to the bulk modulus of the rock material because the bulk modulus of the rock material does not take into account the structure of the rock, such as porosity, but is rather only related to the material that forms the rock.

Next, the fluid saturation is changed from the initial fluid saturation (which may be known from a well log) to a substituted fluid saturation (which is determined by the user of the method). The bulk modulus and density of the substituted fluid are then calculated or taken from measurements. The bulk modulus of the substituted fluid, the bulk and shear modulus of the dry rock and the porosity of the rock (which may be known from a well log) are used to calculate the bulk modulus of the rock with the substituted fluid. The shear modulus of the rock with the substituted fluid is assumed to be equal to the shear modulus of the dry rock.

The density of the rock with the substituted fluid is found.

From the density, shear modulus and bulk modulus of the rock with the substituted fluid, new p-wave and s-wave velocities can be found. These velocities can then in turn be used to generate generated seismic data (and/or to generate one or more seismically-derived attributes, such as acoustic impedance and/or the ratio of p-wave velocity to s-wave velocity and/or amplitude versus angle and/or inverted seismic data). The generated seismic data (and/or seismically-derived attribute(s)) can be compared with acquired seismic data (and/or corresponding acquired seismically-derived attribute(s)). The generated seismic data (and/or seismically-derived attribute(s)) can then be matched with the acquired seismic data (and/or seismically-derived attribute(s)) at other locations in the geological structure (or for any other desired purpose).

However, this method has some limitations.

Firstly, it requires the user of the method to know many parameters of the rock with the initial fluid (e.g. both p-wave and s-wave velocities for the rock with the initial fluid are required, and the bulk modulus of the rock material/mineral is needed to be known or found).

Secondly, the Gassmann approach is based upon a series of assumptions that are not always valid for real rocks. For instance, it is assumed that the solid part of the rock is homogenous, only seismic frequencies are used (preferably as close to zero as possible, such as less than 100 Hz), there is free fluid flow through the rock (i.e. there is no isolated or semi-isolated pores) and there is no interaction between the rock material and the fluid. Of course, in real rocks, these assumptions are violated frequently. For instance, when porosity is low in a real rock, the free fluid flow assumption is violated. When real rocks violate these assumptions, the Gassmann substitution technique can give large errors in the seismic velocity estimates for the rock with the substituted fluid.

Thirdly, the Gassmann technique can give unphysical results if only one of the input parameters are wrong, which can occur from a bad log recording of density or porosity.

Fourthly, the Gassmann technique is not reliable when the rock type in question is a carbonate.

Fifthly, a detailed knowledge of rock physics is required from the user in order to accurately perform Gassmann substitution. This means that only a limited number of people with the required competence can perform Gassmann fluid substitution.

SUMMARY OF THE INVENTION

Due to these limitations, the present inventor has devised a simpler, more robust fluid substitution method.

In a first aspect, the invention provides a method of fluid substitution, wherein an initial data set is provided, wherein a substituted data set is provided, wherein a rock physics model is provided, wherein the initial data set comprises initial data of a geophysical parameter and initial fluid data, and wherein the substituted data set comprises substituted fluid data, the method comprising: using the model and the initial data set to calculate first calculated data of the geophysical parameter; using the model and the substituted data set to calculate second calculated data of the geophysical parameter; calculating the difference between the first calculated data of the geophysical parameter and the second calculated data of the geophysical parameter; and applying said difference to the initial data of the geophysical parameter to produce substituted data of the geophysical parameter.

This method is a simpler and more robust fluid substitution method, which does not suffer from the limitations discussed above in relation to the standard Gassmann fluid substitution method.

These advantages arise from the fact that the present method finds the substituted geophysical parameter indirectly, i.e. the present method finds the difference between the first calculated data of the geophysical parameter and the second calculated data of the geophysical parameter and then applies this difference to the actual original data to find the substituted data. Looked at another way, the output of the modelling steps of the present method is merely a difference between two modelled values, and this difference is then used to modify the actual initial data. This makes for a more robust method as it removes possible errors arising from the models.

In contrast, the prior method finds the substituted geophysical parameter directly, i.e. the substituted geophysical parameter is the direct output of the modelling steps of the method.

When all of the Gassmann assumptions and requirements are met, the present method gives the same result as for the prior method. However, when the Gassmann assumptions are not met, the present method gives better results.

The step of using the model and the initial data set to calculate first calculated data of the geophysical parameter may be performed using Gassmann theory. The step of using the model and the substituted data set to calculate second calculated data of the geophysical parameter may be performed using Gassmann theory. Whilst Gassmann theory may be used in the present method, because of the indirect nature of the present method, the errors and limitations associates with a direct Gassmann calculation are avoided.

By "calculate" the first/second calculated data of the geophysical parameter, it may mean "determine", "estimate" or "find" said data using the model.

In comparison to the prior method, the present method provides a faster and simpler fluid substitution that requires fewer operations, fewer inputs and fewer steps, while being more robust. It also lowers the expertise required by the user of the method in order to successfully perform fluid substitution.

Using the model and the initial data set to calculate a first calculated value of the geophysical parameter may comprise calibrating the model using the initial data set. During the calibration, the initial data is used to calibrate the model. The calibrated model may be defined by a plurality of parameters, one of which may be the geophysical parameter in question. This geophysical parameter of the calibrated model may be the first calculated geophysical parameter mentioned above.

The first calculated data of the geophysical parameter may be different to the initial data of the geophysical parameter.

Using the model and the substituted data set to calculate the second calculated value of the geophysical parameter may comprise using the calibrated model and the substituted data set to calculate the second calculated value of the geophysical parameter. In this case, the model that is calibrated using the initial data is then used to find the second calculated value of the geophysical parameter. This may be achieved by inputting the substituted data set (e.g. the substituted fluid data) into the calibrated model.

The second calculated data of the geophysical parameter may be different to the first calculated data of the geophysical parameter.

The geophysical parameter may comprise (or may consist of) seismic velocity.

The geophysical parameter may comprise (or may consist of) p-wave velocity. In this case, the initial data set used to calculate the first calculated value of the p-wave velocity may not comprise s-wave velocity. Unlike the prior Gassmann method, in the present method there is no need to have initial s-wave velocity data when finding substituted p-wave velocity data. This is of benefit to the present method since many existing well logs do not contain s-wave velocity data, s-wave velocity data is expensive to acquire and s-wave velocity data is noisier than p-wave velocity data. P-wave velocity may be found from well logs or seismic surveys.

The geophysical parameter may comprise (or may consist of) s-wave velocity. In this case, the initial data set used to calculate the first calculated value of the s-wave velocity may not comprise p-wave velocity. Unlike the prior Gassmann method, in the present method there is no need to have initial p-wave velocity data when finding substituted s-wave velocity data. S-wave velocity may be found from well logs or seismic surveys.

The initial data set may not comprise s-wave velocity data.

Thus, the initial data set may only have one of p-wave and s-wave velocity data.

The initial data set may comprise rock density (e.g. the density of the rock with the initial fluid), shale volume, clay volume, porosity, depth and/or geothermal gradient. These may be in addition to the geophysical parameter initial data and the initial fluid data mentioned above. These data are all readily available, e.g. from standard well logs, or at least are easily estimated, and they do not require detailed knowledge of the rock physics in order to use them in the present method. The initial data set may consist of the geophysical parameter initial data, the initial fluid data mentioned above and one or more of density, shale volume, clay volume, porosity, depth and/or geothermal gradient.

The initial fluid data may comprise (or consist of) saturation and/or fluid properties of an initial fluid. The fluid properties may comprise or consist of bulk modulus and/or density of the initial fluid.

These data can be calculated and/or measured. They do not require detailed knowledge of the rock physics in order to use them in the present method.

The initial fluid data may be for brine, or a fluid comprising a significant level of brine (such as more than 30%, 50%, 70% or 90% brine). Additionally or alternatively, the initial fluid data may be for hydrocarbons, or a fluid comprising a significant level of hydrocarbons (such as more than 30%, 50%, 70% or 90% hydrocarbons). The initial fluid may be a mixture comprising (or consisting of) hydrocarbons and brine.

The term "saturation" used herein may describe the fraction of two fluids that are mixed to form the actual fluid present (e.g. the initial fluid). As an example, a saturation of 0.9 may mean 90% brine and 10% hydrocarbon of a given type.

The initial data set may not comprise any other forms of data other than those mentioned above, i.e. the first calculated geophysical parameter may be calculated using only the data mentioned above, e.g. the model may be calibrated using only the data mentioned above.

The initial data set may comprise only data that is readily available, or at least is easily estimated, and is easily used. There is no need to obtain data that is not readily available, or to otherwise derive data requiring a high level of expertise from the user. The initial data may all be obtainable from readily-available standard well logs.

Thus, the first calculated geophysical parameter data may be calculated using only data that is readily available and is easily used, e.g. the model may be calibrated using only data that is readily available and is easily used. The first calculated geophysical parameter data may be calculated (purely) using easily-obtainable data from readily-available standard well logs in said model.

The initial data set may comprise observed or measured or acquired or estimated/calculated data from a physical geological structure (such as a reservoir, e.g. from well logs). Additionally or alternatively, the initial data set may comprise data produced in a model.

The substituted fluid data may comprise (or consist of) saturation and/or fluid properties of a substituted fluid. The fluid properties may comprise or consist of bulk modulus and/or density.

The substituted fluid data can be selected by the user of the method, depending on what fluid the user would like to substitute into the rock. For instance, the fluid properties (such as bulk modulus and/or density) can be selected, defined and/or calculated. The saturation can be selected and/or defined. The saturation, together with the fluid properties of the fluid components that make up the substituted fluid (e.g. brine and hydrocarbons), can be used to find, calculate or estimate the fluid properties (e.g. the bulk modulus and/or density) of the substituted fluid as a whole.

The substituted fluid data can be found by matching the output substituted data of the geophysical parameter (e.g. the substituted seismic velocity data) and/or generated geophysical data generated from the substituted data of the geophysical parameter (and/or one or more geophysical attributes derived from said generated geophysical data, such as acoustic impedance and/or the ratio of p-wave velocity to s-wave velocity and/or amplitude versus angle and/or inverted seismic data) with measured data of the geophysical parameter and/or measured geophysical data (and/or corresponding attribute(s) derived from said measured geophysical data, such as acoustic impedance and/or the ratio of p-wave velocity to s-wave velocity and/or amplitude versus angle and/or inverted seismic data) at different location(s) in the geological structure. This may be an iterative process.

The substituted fluid data may be for hydrocarbons, or a fluid comprising significant amounts of hydrocarbons (such as more than 30%, 50%, 70% or 90% hydrocarbons). The substituted fluid data may be for a fluid that is desirable to find somewhere in the geological structure. The substituted fluid data may be for brine, or a fluid comprising significant amounts of brine (such as more than 30%, 50%, 70% or 90% brine). The substituted fluid data may comprise a mixture of brine and hydrocarbons. The substituted fluid may be different to the initial fluid.

The substituted data set may consist of the substituted fluid data. The substituted data set may not comprise any data relating to the geophysical parameter, since this is what is to be calculated using the present method. The substituted data set may also not comprise any of the other data types mentioned above (such as rock density, shale volume, clay volume, porosity, depth and/or geothermal gradient), since there is no need for this data to be included in the substituted data set.

There is no need to use any data other than the substituted fluid data to calculate the second calculated data of the geophysical parameter because of the use of the calibrated model. Since the model has been calibrated using the first data set, all that is required to find the second calculated data of the geophysical parameter is to change the substituted fluid data in the model in order to output the second calculated data of the geophysical parameter.

Data concerning the bulk modulus of the solid rock may be automatically set in the calibration process. By "solid rock" it is meant the bulk modulus of material/minerals that form the rock itself. This is unlike the prior Gassmann method where the solid rock bulk modulus was required as an input from user. In the present method, there may therefore be no need for the user of the present method to handle or find or understand data concerning the bulk modulus of the solid rock.

In the present method, dry rock properties are automatically estimated in the calibration process. Dry rock properties may be the bulk and/or shear modulus and/or density of the rock without the initial (or any) fluid being present therein. This is unlike the prior Gassmann method where it was necessary for the user to find the dry rock properties. In the present method, there may therefore be no need for the user of the present method to handle or find or understand the dry rock properties.

Thus, in the present method there is no need for the method to be performed by a skilled experienced user with detailed knowledge of rock physics.

The method may be automatised. By automatised, it is meant that once the initial and substituted data sets have been provided, the method may proceed without the input of the user. This is allowed to be the case for the present method because no input is required from the user. In contrast, the prior Gassmann method required input from a skilled and experienced user in order to make educated decisions concerning the rock physics.

The method may comprise selecting the model. This may be performed by the user/operator of the method. The present method is not limited to any particular for its use. However, as is known, some rock physics models describe certain types of rock better than others.

The model may be a siliciclastic model, such as the Hertz-Mindlin model I. This may be the case when the rocks in question are siliciclastic.

The model may be a carbonate model, such as the T-Matrix model. This may be the case when the rocks in question are carbonates.

The model may be a non-siliciclastic model, such as the T-Matrix model. This may be the case when the rocks in question are not siliciclastic.

In particular, the prior Gassmann theory method can produce inaccurate results for carbonates. The present method does not suffer from these same issues.

A model may explain or describe the relationship between velocity (e.g. seismic velocity, such as p-wave and/or s-wave velocity) and physical features of the rock (such as porosity).

The method may comprise obtaining the substituted fluid data by selecting and/or measuring and/or calculating the substituted fluid data. As mentioned above, the substituted fluid data may be selected depending on what fluid-type the substituted fluid is desired to be. In particular, the substituted fluid saturation may be selected. Additionally or alternatively, the substituted fluid data may be calculated or measured. For instance, the bulk modulus and density of the fluid can be calculated or measured.

The substituted fluid data may be obtained (e.g. selected, estimated or calculated) with a view of attempting to match the substituted data of the geophysical parameter with measured/acquired data of the geophysical parameter in question at different location(s) in the geological structure (e.g. via an iterative process).

Preferably, however, the substituted data of the geophysical parameter (e.g. the seismic velocity) is used to generate generated geophysical data (such as seismic data) and/or one or more generated attributes derived from said generated geophysical data (such as acoustic impedance and/or the ratio of p-wave velocity to s-wave velocity and/or amplitude versus angle and/or inverted seismic data). The generated geophysical data and/or attribute(s) may be compared with acquired geophysical data (such as acquired seismic data) from different location(s) in the geological structure, and/or compared with corresponding attribute(s) derived from said acquired geophysical data (such as acoustic impedance and/or the ratio of p-wave velocity to s-wave velocity and/or amplitude versus angle and/or inverted seismic data respectively). The comparison may be used to attempt to find what fluid may be present at other location(s) in the geological structure. The process may include matching the generated geophysical data and/or attribute(s) with the acquired geophysical data and/or attribute(s) by altering the substituted data set. This matching may be an iterative process.

Once the generated geophysical data and/or attribute(s) match the measured/acquired data and/or attribute(s), it may be that the fluid present in the geological structure at said different location(s) has the same or similar fluid properties as the substituted fluid.

The method may comprise acquiring the acquired geophysical data, e.g. by performing a geophysical survey (such as a seismic survey) over the geological structure.

An attribute may be a geophysical attribute, which may be a data type that describes the physics of the geological structure. The attribute may be a physical characteristic of the geological structure. In particular, it may be a characteristic that describes the behaviour of the geological structure when the geological structure is studied using geophysical energy, such as seismic energy.

The method may comprise obtaining the initial data set by measuring and/or calculating the initial data set. As mentioned above, the initial data set may be measured from well logs (e.g. for any of the initial data types (possibly including p-wave and/or s-wave velocity)). However, at least some of the initial data set can also be modeled or estimated.

Thus, the method may comprise obtaining at least some of the initial data set from well logs. It may be the rock density, shale volume, clay volume, porosity, depth and/or geothermal gradient that is/are obtained from well logs. The data of the geophysical parameter (e.g. the seismic velocity) may also be found from well logs.

In this case, the method may also comprise drilling a well to obtain said well logs.

In second aspect, the invention provides a method of prospecting for hydrocarbons comprising: performing any of the methods discussed above, and using the substituted data of the geophysical parameter to prospect for hydrocarbons.

Using the substituted data of the geophysical parameter to prospect for hydrocarbons may comprise generating generated geophysical data from the substituted data of the geophysical parameter and/or one or more geophysical attributes derived from said generated geophysical data (such as acoustic impedance and/or the ratio of p-wave velocity to s-wave velocity and/or amplitude versus angle and/or inverted seismic data). There may be provided acquired geophysical data from a location in the geological structure different to the location from which the initial data set is acquired and/or one or more corresponding attribute(s) derived from said acquired geophysical data (such as acoustic impedance and/or the ratio of p-wave velocity to s-wave velocity and/or amplitude versus angle and/or inverted seismic data). The method may comprise comparing the acquired geophysical data and/or attribute(s) with the generated geophysical data and/or corresponding attribute(s). From said comparison, the method may comprise estimating the type of fluid present at the location from which the acquired data is acquired. If the estimated fluid is of a desirable type, the method may comprise drilling a well at or in the vicinity of said location.

The geophysical data may be seismic data. The one or more attributes may be seismically-derived attributes (such as acoustic impedance and/or the ratio of p-wave velocity to s-wave velocity and/or amplitude versus angle and/or inverted seismic data).

The method may comprise acquiring the acquired geophysical data.

Prospecting for hydrocarbons may comprise matching the generated geophysical data and/or attribute(s) with acquired geophysical data and/or corresponding attribute(s) at one or more different locations in the geological structure. Once the generated geophysical data and/or attribute(s) match the acquired geophysical data and/or corresponding attribute(s), it may be that the fluid present in the geological structure at said different location(s) has the same or similar fluid properties as the substituted fluid. The matching process may be iterative.

In a third aspect, the invention may provide a method of producing hydrocarbons, comprising: performing any of the methods of the first or second aspects; and producing hydrocarbons.

The hydrocarbons may be produced through the well that is drilled at or in the vicinity of a location that is calculated to have a desirable fluid therein.

In a fourth aspect, the invention provides a computer program product comprising computer readable instructions that, when run on a computer, is configured to perform any of the methods of discussed above.

The invention may be performed using machine learning. For example, the method may comprise using machine learning to perform at least part of the method. One, some or all of the steps of the method may comprise using machine learning. Using machine learning may comprise using machine-learning-based regression algorithms, for example.

Machine learning is preferably used to calibrate the rock physics model. In a preferred embodiment, the model is calibrated using machine learning by nonlinear multivariate regression.

BRIEF DESCRIPTION OF THE DRAWINGS

Certain preferred embodiments will now be described by way of example only and with reference to the accompanying drawings, in which FIG. 2 shows a plot of p-wave velocity against porosity, highlighting some of the steps in the present method.

DETAILED DESCRIPTION

Figure 1:
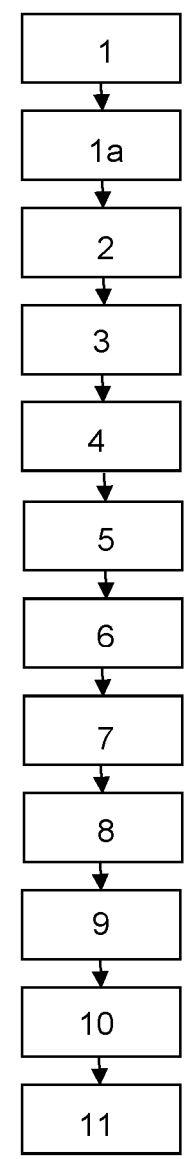
FIG. 1 shows a workflow of one embodiment of the present invention.

Regarding FIG. 1, shown is a workflow of an embodiment the present method.

At step 1, an exploration well is drilled into a subterranean geological structure, such as a hydrocarbon reservoir. After or during this drilling step, an initial data set can be gathered. This may be achieved by taking well logs (step 1a). The well logs are merely standard well logs. The well logs consist of a resistivity log (which is used to estimate the saturation of the fluid present in the rock); p-wave velocity; density of the rock with the fluid present in the rock; shale volume and/or clay volume (which may be found from a gamma ray log); and porosity of the rock. The initial data need not comprise non-standard well logs, such as s-wave velocity. The initial data set also includes properties of the fluid present in the rock (i.e. the bulk modulus and density), which can be measured or estimated.

At step 2, a rock physics model is selected. This selection is based on the type of rock present in the geological structure (e.g. siliciclastic or carbonate). Any rock physics model that adequately describes the rocks present in the geological structure can be used.

At step 3, the rock physics model is calibrated using the well log data. This provides a first calculated value of the p-wave velocity. With regard to FIG. 2, this shows a plot of p-wave velocity ($v_p$) against porosity (ø). In FIG. 2, original data p-wave and porosity data is shown with symbol □. From the well log there may be numerous such data points, but only two are shown in FIG. 2 for clarity. Once the rock physics model is calibrated using the initial data, the calibrated p-wave velocity in the calibrated model for a given porosity may be different to the measured p-wave velocity for the same porosity. In FIG. 2, the first calculated value of the p-wave velocity is shown with symbol ○. A first calculated value of the p-wave velocity may be found for each of the initial p-wave velocity values in the initial data.

At step 4, new fluid data (e.g. the saturation, the density and the bulk modulus) is provided. These may be selected by the user of the method, or may be found in a matching process of trying to match generated seismic data (and/or one or more attribute(s) derived from the generated seismic data, such as acoustic impedance and/or the ratio of p-wave velocity to s-wave velocity and/or amplitude versus angle and/or inverted seismic data) generated from the substituted p-wave velocity that is output from the present method with acquired seismic data (and/or corresponding attribute(s) derived from the acquired seismic data) acquired from different location(s) in the geological structure.

At step 5, a second calculated value of the p-wave velocity is found using the calibrated model with the new fluid data. Regarding FIG. 2, this second calculated value of the p-wave velocity is shown in with symbol ● and may be different to the first calculated value of the p-wave velocity for the same porosity value. A second calculated value of the p-wave velocity may be found for each of the first calculated values of the p-wave velocity.

At step 6, a difference ($\Delta v_p$) between the first and second calculated values of the p-wave velocity is found. This may occur for each of the respective first and second calculated values of the p-wave velocity.

At step 7, said respective differences ($\Delta v_p$) are applied to the respective original well log p-wave values (□) to find substituted p-wave data (■). This occurs for each of the initial p-wave data values (□). Thus, the output from step 7 is substituted p-wave data (■): an estimate of the p-wave velocity that would be present if the current fluid in the rock were to be substituted for a different fluid.

At step 8, the substituted p-wave velocity is used to generate generated seismic data and/or one or more attribute(s) derived from the generated seismic data (such as acoustic impedance and/or the ratio of p-wave velocity to s-wave velocity and/or amplitude versus angle and/or inverted seismic data). The generated seismic data and/or attribute(s) are compared against acquired seismic data and/or corresponding attribute(s) derived from the acquired seismic data (such as acoustic impedance and/or the ratio of p-wave velocity to s-wave velocity and/or amplitude versus angle and/or inverted seismic data) at one or more different location in the geological structure (which may be known from a seismic survey of the geological structure—the method may also comprise performing such a survey) to see if the generated seismic data and/or attribute(s) match any of the acquired seismic data and/or attribute(s). Steps 4-8 may be performed iteratively in an attempt to match acquired seismic data to possible substituted fluid data.

At step 9, the method comprises identifying one or more possible locations in the geological structure where fluid with desirable fluid data (such as a saturation, density and bulk modulus indicative of hydrocarbon fluid) may be.

At step 10, the method comprises drilling new well(s) at said location(s).

At step 11, if the fluid at said location(s) is found to be of the desirable type as predicted (e.g. high in hydrocarbon content), the method comprises producing hydrocarbons from said new well(s).

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

The invention claimed is:

1. A method of prospecting for hydrocarbons comprising:
performing a method of fluid substitution, wherein an initial data set is provided, wherein a substituted data set is provided, wherein a rock physics model is provided, wherein the initial data set comprises initial data of a geophysical parameter and initial fluid data, and wherein the substituted data set comprises substituted fluid data, the method of fluid substitution comprising:
using the model and the initial data set to calculate first calculated data of the geophysical parameter;
using the model and the substituted data set to calculate second calculated data of the geophysical parameter;
calculating the difference between the first calculated data of the geophysical parameter and the second calculated data of the geophysical parameter; and
applying said difference to the initial data of the geophysical parameter to produce substituted data of the geophysical parameter, and
using the substituted data of the geophysical parameter and acquired data of the geophysical parameter to estimate a type of fluid present at a location from which the acquired data of the geophysical parameter is taken, and
if the estimated fluid is of a desirable type, drilling a well at or in the vicinity of said location.

2. A method as claimed in claim 1, wherein using the model and the initial data set to calculate a first calculated value of the geophysical parameter comprises calibrating the model using the initial data set.

3. A method as claimed in claim 1, wherein using the model and the substituted data set to calculate the second calculated value of the geophysical parameter comprises using the calibrated model and the substituted data set to calculate the second calculated value of the geophysical parameter.

4. A method as claimed in claim 1, wherein the geophysical parameter comprises seismic velocity.

5. A method as claimed in claim 4, wherein the geophysical parameter is p-wave velocity and the initial data set used to calculate the first calculated value of the p-wave velocity does not comprise s-wave velocity.

6. A method as claimed in claim 1, wherein the initial data set comprises rock density, shale volume or clay volume, porosity, depth.

7. A method as claimed in claim 1, wherein the initial fluid data comprises the saturation of an initial fluid and fluid property data of the initial fluid, and/or the substituted fluid data comprises the saturation of a substituted fluid and fluid property data of the substituted fluid.

8. A method as claimed in claim 7 wherein the initial fluid property data of the initial fluid comprises the bulk modulus and/or density of the initial fluid and/or the fluid property data of the substituted fluid comprises bulk modulus and/or density of the substituted fluid.

9. A method as claimed in claim 1, wherein data concerning at least one of the bulk modulus of the solid rock and the dry rock properties is not handled by the user during the method.

10. A method as claimed in claim 1, wherein the method may be automated.

11. A method as claimed in claim 1, comprising at least one of the following steps:
selecting the model;
obtaining the substituted fluid data by selecting and/or measuring and/or calculating the substituted fluid data; and
obtaining the initial data set by measuring and/or calculating the initial data set.

12. A method as claimed in claim 11, comprising obtaining at least some of the initial data set from well logs.

13. A method as claimed in claim 12, comprising drilling a well to obtain said well logs.

14. A method as claimed in claim 1, comprising:
finding the substituted fluid data by:
generating generated geophysical data from the substituted data of the geophysical parameter, and/or generating one or more attributes derived from said generated geophysical data;
comparing said generated geophysical data and/or attribute(s) with acquired geophysical data and/or one or more corresponding attributes derived from said acquired geophysical data, wherein said acquired geophysical data has been acquired from a location different to the location where the initial data set originates from; and
finding the substituted fluid data by matching the generated geophysical data and/or attribute(s) to the acquired geophysical data and/or corresponding attribute(s).

15. A method of prospecting for hydrocarbons comprising:
Performing the method of claim 1, and
using the substituted data of the geophysical parameter to prospect for hydrocarbons.

16. A method as claimed in claim 15, wherein using the substituted data of the geophysical parameter to prospect for hydrocarbons comprises:
generating generated geophysical data, and/or attributes derived from said generated geophysical data, from the substituted data of the geophysical parameter;
comparing acquired geophysical data and/or corresponding attributes derived from said acquired geophysical data with the respective generated geophysical data and/or attributes derived from said generated geophysical data;
from said comparison, estimating the type of fluid present at the location from which the acquired data of the geophysical parameter is taken, and
if the estimated fluid is of a desirable type, drilling a well at or in the vicinity of said location.

17. A method of producing hydrocarbons, comprising:
performing the method of claim 1; and
producing hydrocarbons.

18. A method as claimed in claim 1, the method comprising using machine learning to perform at least part of the method.

19. A computer program product comprising computer readable instructions that, when run on a computer, is configured to perform the method of claim 1.

20. A method producing hydrocarbons, comprising:
performing a method of fluid substitution, wherein an initial data set is provided, wherein a substituted data set is provided, wherein a rock physics model is provided, wherein the initial data set comprises initial data of a geophysical parameter and initial fluid data, and wherein the substituted data set comprises substituted fluid data, the method of fluid substitution comprising:
using the model and the initial data set to calculate first calculated data of the geophysical parameter;
using the model and the substituted data set to calculate second calculated data of the geophysical parameter;
calculating the difference between the first calculated data of the geophysical parameter and the second calculated data of the geophysical parameter;
applying said difference to the initial data of the geophysical parameter to produce substituted data of the geophysical parameter; and
producing hydrocarbons, wherein the hydrocarbons are produced through a well that is drilled at or in the vicinity of a location that is calculated to have a desirable fluid therein.

* * * * *